(12) United States Patent
Kormandel

(10) Patent No.: US 8,579,290 B2
(45) Date of Patent: Nov. 12, 2013

(54) INTERCHANGEABLE THREE DIMENSIONAL (3D) GLASSES AND THREE DIMENSIONAL CONNECT-THE-DOTS DRAWINGS

(75) Inventor: Sagi Kormandel, Santa Monica, CA (US)

(73) Assignee: 3D Experience, Inc., Corona Del Mar, CA (US)

( * ) Notice: Subject to any disclaimer, the term of this patent is extended or adjusted under 35 U.S.C. 154(b) by 0 days.

(21) Appl. No.: 13/272,836

(22) Filed: Oct. 13, 2011

(65) Prior Publication Data
US 2012/0091659 A1  Apr. 19, 2012

Related U.S. Application Data

(60) Provisional application No. 61/392,844, filed on Oct. 13, 2010.

(51) Int. Cl.
A63F 3/00 (2006.01)

(52) U.S. Cl.
USPC .................................. 273/241; 434/170

(58) Field of Classification Search
USPC .......... 273/241; 434/160, 161, 162, 163, 164, 434/170; 446/147, 219
See application file for complete search history.

(56) References Cited

U.S. PATENT DOCUMENTS

2003/0063084 A1 * 4/2003 Burke ......................... 345/419

\* cited by examiner

*Primary Examiner* — Vishu K. Mendiratta

(57) ABSTRACT

Interchangeable glasses in accordance with one embodiment include a glasses frame; a first pair of lenses that are interchangeable with the glasses frame and have a first set of lenses that are a first color; a second pair of lenses that are interchangeable with the glasses frame and have a second set of lenses that are a second color; and a third pair of lenses that are interchangeable with the glasses frame and have a third set of lenses, where the third set of lenses includes a first lens that is the first color and a second lens that is the second color.

8 Claims, 8 Drawing Sheets

INTERCHANGEABLE THREE DIMENSIONAL (3D) GLASSES AND THREE DIMENSIONAL CONNECT-THE-DOTS DRAWINGS

RELATED APPLICATIONS

This application claims priority and is a non-provisional of U.S. Provisional Patent Application No. 61/392,844, filed Oct. 13, 2010, entitled "INTERCHANGEABLE THREE DIMENSIONAL (3D) GLASSES AND THREE DIMENSIONAL 5 CONNECT-THE-DOTS DRAWINGS," which application is incorporated herein by reference in its entirety.

BACKGROUND

1. Field of the Invention

The present invention relates to three dimensional (3D) glasses and connect-the-dots drawings.

2. Discussion of the Related Art

U.S. Pat. No. 7,661,815, filed Nov. 17, 2008, which is a Continuation-In-Part of U.S. patent application Ser. No. 11/324,465, filed Jan. 3, 2006, now U.S. Pat. No. 7,452,069, which claims the benefit of U.S. Provisional Application No. 60/680,238, filed May 12, 2005, entitled EYEFRAME WITH INTERCHANGEABLE LENSPIECES HELD BY A MAGNETIC CLOSURE AND INTERCHANGEABLE LENS SYSTEM, discloses an eyeframe system includes a rimwire and an interchangeable lenspiece. A hinged closure on the rimwire fastens the lenspiece to the rimwire. The closure includes a magnetic closure that slides beneath a nose bridge of the rimwire. The closure is held closed by mechanical and magnetic forces. The system can include a plurality of different lenspieces that are interchanged to attach lenses with different qualities.

U.S. Pat. No. 6,971,745, filed Apr. 29, 2004, which is a continuation-in-part of application Ser. No. 10/677,351, filed on Oct. 3, 2003, entitled EYEWEAR HAVING LENSES WITH RIMS, discloses a method for assembly of an eyewear and an eyewear structure are provided to incorporate preferred properties into the eyewear. A lens is encircled by a rim element having the preferred properties thereby forming a lens unit which is removably attached to the eyewear structure. Therefore, the lens can be better retained within the eyewear structure. Such lens units can be made interchangeable one to another, and with a variety of individual properties such that replacement of the lens unit attached to the eyewear structure with a selected one of the interchangeable lens units, will change the properties of the eyewear as per user's preferences.

Conventional connect-the-dot drawings are known. These drawings consist of a plurality of numbered dots on a page of paper. By connecting the dots in the order of the numbered dots with lines using a drawing instrument (e.g., a pen, pencil, crayon, paint, etc.), a user creates a completed drawing. For example, a user draws a line between Dot 1 and Dot 2, then Dot 2 to Dot 3, Dot 3 to Dot 4, and so forth. In this manner a completed image is created.

BRIEF DESCRIPTION OF THE DRAWINGS

The features and advantages of the present embodiments will be apparent from the following description, presented in conjunction with the following drawings, wherein.

Figure 1:
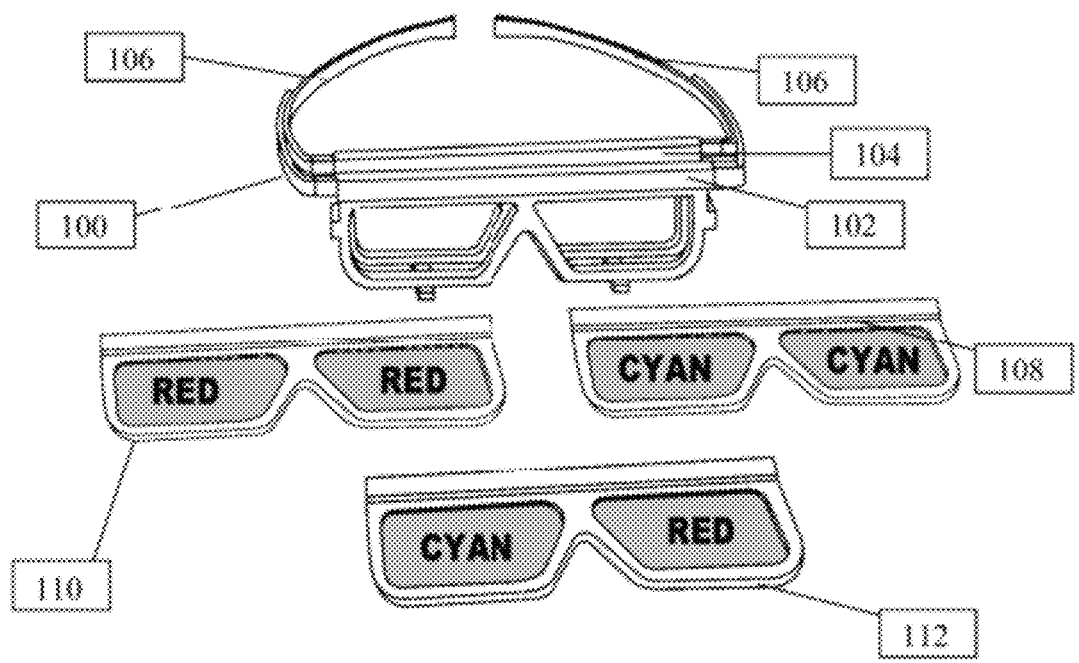
FIG. 1 is a diagram illustrating a glasses frame and three interchangeable sets of lenses in accordance with one embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION OF THE DRAWINGS

The following description is not to be taken in a limiting sense, but is made merely for the purpose of describing the general principles of the invention. The scope of the invention should be determined with reference to the claims. The present embodiments address the problems described in the background while also addressing other additional problems as will be seen from the following detailed description.

The present embodiments improve upon the standard connect-the-dot game by creating three dimensional (3D) images once completed. Some of the present embodiments include 3D eye-glasses having interchangeable lenses. Some embodiments also include cyan colored and red colored pencils, pens, crayons or other writing instruments along with a set of 3D connect-the-dot images. Other colored writing instruments are utilized in other embodiments.

The 3D connect-the-dot game (also referred to as an activity book) optionally comprises two separate sets of numbered dots that are filled out by different colors. One set of dots is red and the other set of dots is cyan colored. One set of dots is connected using a cyan colored pencil (or other writing instrument) and a second set of dots will be connected using a red colored pencil. The illusion created with these two colors will create a 3D image when 3D glasses are worn to view the completed drawing.

In one embodiment, the 3D glasses include three pairs of interchangeable lens (also referred to herein as filters) that can be inserted and removed into a frame. The frame can be made of plastic, metal or other suitable material. One pair of interchangeable lenses includes two cyan colored lenses. The second pair of interchangeable lenses includes two red colored lenses. The third pair of interchangeable lenses includes one cyan colored lens and one red lens. The interchangeable lenses can be made from plastic, metal or other suitable material. Some embodiments can also be used with normal 3D glasses.

In another embodiment, the 3D glasses include a frame and interchangeable lenses configured such that they include a set of red lenses, a set of cyan lenses and a third set including one red lens and one cyan lens.

In yet another embodiment, the 3D glasses include a frame with a total of four interchangeable lenses. The interchangeable lenses include one red lens and one cyan lens on a left side of the glasses and one red lens and one cyan lens on a right side of the glasses. (See, e.g., FIG. 13.)

In operation, the first pair of interchangeable lenses (i.e., the cyan colored lenses) is utilized when the red colored pencil is used The red colored pencil is used to fill out the dots that correspond to the red dots. Once the red dots have been completed, the cyan inserts are taken out of the plastic frame and replaced with the red inserts. Just like the cyan filters, these red filters are worn when the cyan colored pencil is in use The cyan colored pencil is then used to fill out the dots that correspond to the cyan dots. When the red glasses are worn, the red image completed prior will not be visible. When the cyan glasses are worn, the cyan image completed will not be visible. Once both sets of dots have been completed, the third pair of interchangeable lenses is inserted into the plastic frames. Again, this pair of interchangeable lenses contains one red filter and one cyan filter. When these glasses are worn, both sets of dots will be visible and the final, completed image will appear in 3D. This type of 3D drawing is referred to, as an anaglyph.

The embodiments described herein will be described with reference to cyan and red colored lenses and color instruments. However, it should be understood that other color schemes may also be utilized and are known in the art. For example, red and blue lenses are utilized in one embodiment. Other embodiments include various possible combinations of colors for anaglyphs, including, for example, red-green, red-blue, green-blue, green-magenta (red+blue), or blue-yellow (red+green). Corresponding coloring instruments are utilized according to the color of the lenses. Any colors that allow for creating 3D images can be utilized in various embodiments.

One embodiment can be characterized as a set of glasses having three sets of interchangeable lenses, wherein the first set of interchangeable lenses includes lenses of a first color, the second set of interchangeable lenses includes lenses of a second color, and the third set of interchangeable lenses includes one lens of the first color and a second lens of the second color.

Another embodiment can be characterized as a connect-the-dot drawing having a set of dots of a first color and a second set of dots of a second color, wherein the dots are positioned such that a completed three dimensional drawing is created after the dots are connected.

A subsequent embodiment includes a three dimensional game system including a set of glasses having three sets of interchangeable lenses, wherein the first set of interchangeable lenses includes lenses of a first color, the second set of interchangeable lenses includes lenses of a second color, and the third set of interchangeable lenses includes one lens of the first color and a second lens of the second color; a connect-the-dot drawing having a first set of dots of the first color and a second set of dots with the second color; a first drawing instrument of the first color; and a second drawing instrument of the second color. Alternatively, the game system can be provided with three pairs of glasses. For example, one set of glasses includes two red lenses. The second set of glasses includes two cyan lenses. The third set of glasses includes one red and one cyan lens. As discussed previously, other color schemes can also be utilized in other embodiments.

Multiple three dimensional connect-the-dot drawings can be put together as an activity book in accordance with some embodiments. For example, an activity book may include between 15 and 50 three dimensional connect-the-dot drawings in accordance with various embodiments. In other embodiments, activity books can include any number of connect-the-dot drawings.

Referring to FIG. 1, a diagram is shown illustrating a glasses frame and three interchangeable sets of lenses in accordance with one embodiment. Shown is the glasses frame 100, which includes a front frame 102, a back frame 104, and a pair of temple portions 106. Also shown is a first interchangeable set of lenses 108, a second interchangeable set of lenses 110, and a third interchangeable set of lenses 112. The first interchangeable set of lenses 108 includes two cyan lenses, 114, 116. The second interchangeable set of lenses 110 includes two red lenses, 118, 120. The third interchangeable set of lenses 112 includes a cyan lenses 122 and a red lens 124.

The first, second and third sets of lenses 108, 110, 112 can be interchangeably placed into the glasses frame 100. The sets of lenses 108, 110, 112 are placed in-between the front frame 102 and the back frame 104. In the embodiment shown, the sets of interchangeable lenses 108, 110, 112 slide into the glasses frame 100 through the top of the glasses frame. In alternative embodiments, the lenses slide into the glasses frame through the sides or bottom of the glasses frame. Optionally, a latch (not shown) can be utilized to hold the sets of lenses securely in the glasses frame.

Figure 13:
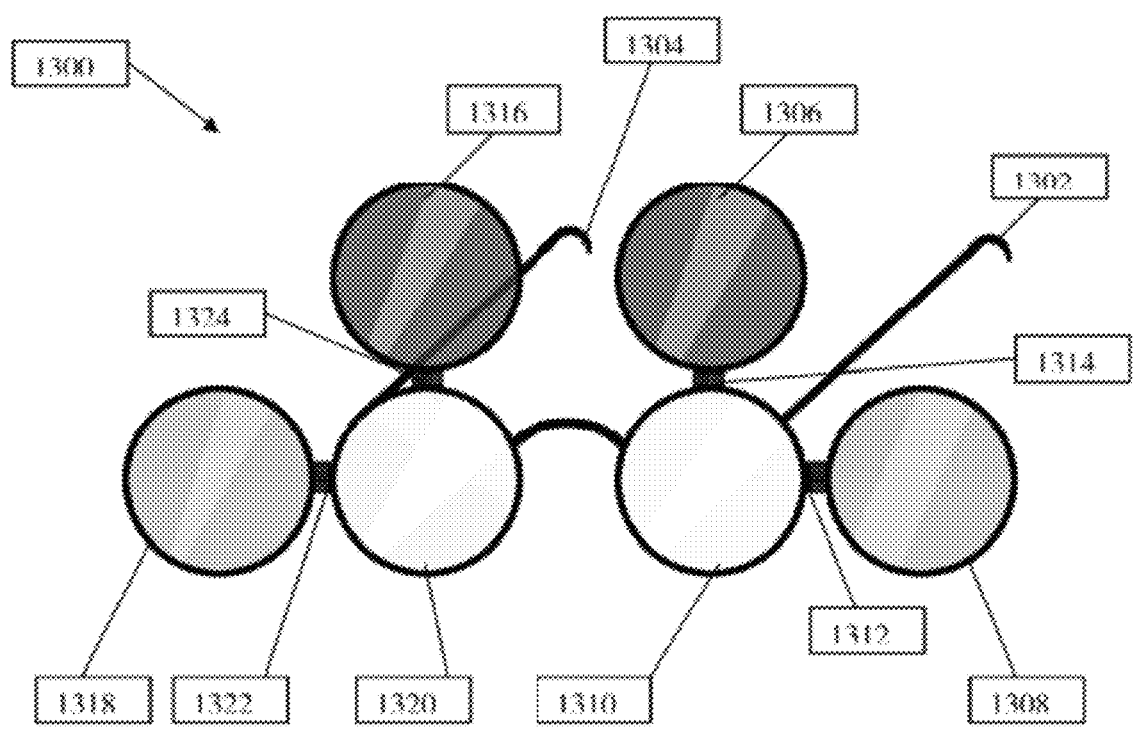
FIG. 13 is a diagram illustrating an alternative embodiment of a set of glasses having interchangeable lenses in accordance with one embodiment.

In other embodiments, a different configuration is utilized in order to implement the interchangeable sets of lenses. For example, the interchangeable lenses 108, 110, 112 can be clipped to a glasses frame 100 instead of sliding between a front frame 102 and a back frame 104. In this embodiment, the glasses frame 100 only needs a single frame, i.e., not both the front frame 102 and the back frame 104. Other means of attaching the interchangeable frames 108, 110, 112 are utilized in other embodiments, including, for example, as shown in FIG. 13 below.

Figure 2:
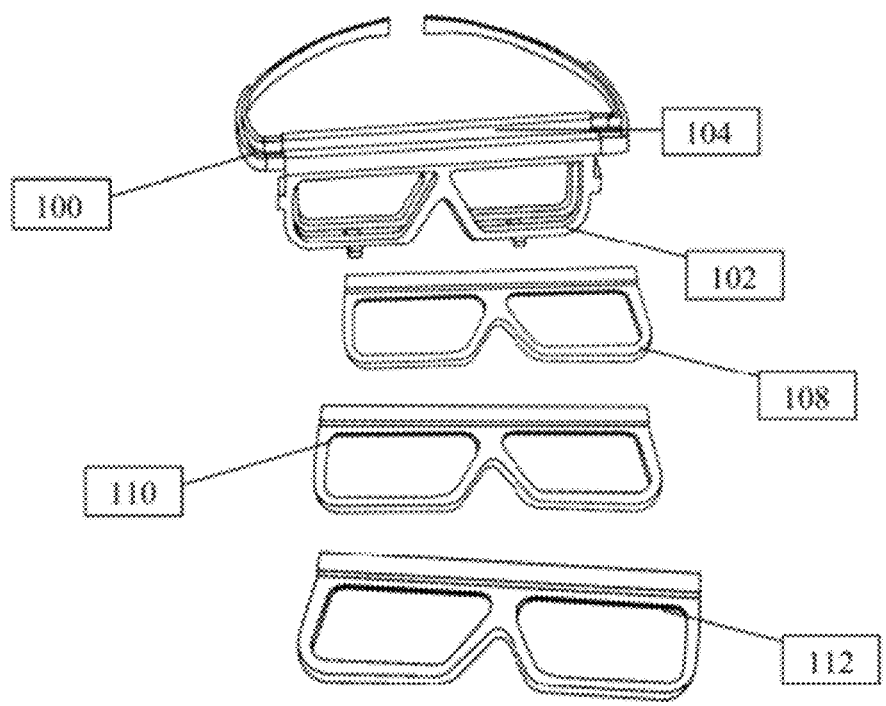
FIG. 2 is a diagram illustrating a glasses frame and three interchangeable sets of lenses of FIG. 1, where the lenses (also referred to as filters) have been removed.

Referring to FIG. 2, a diagram is shown illustrating a glasses frame and three interchangeable sets of lenses of FIG. 1, where the lenses (also referred to as filters) have been removed. Shown is the glasses frame 100, which includes the front frame 102, the back frame 104, and the pair of temple portions 106. Also shown is the first interchangeable set of lenses 108, the second interchangeable set of lenses 110, and the third interchangeable set of lenses 112. The lenses have been removed from all of the sets of lenses. As described above, different colored lenses can be utilized in the interchangeable lenses 108, 110, 112 in accordance with different embodiments.

Figure 3:
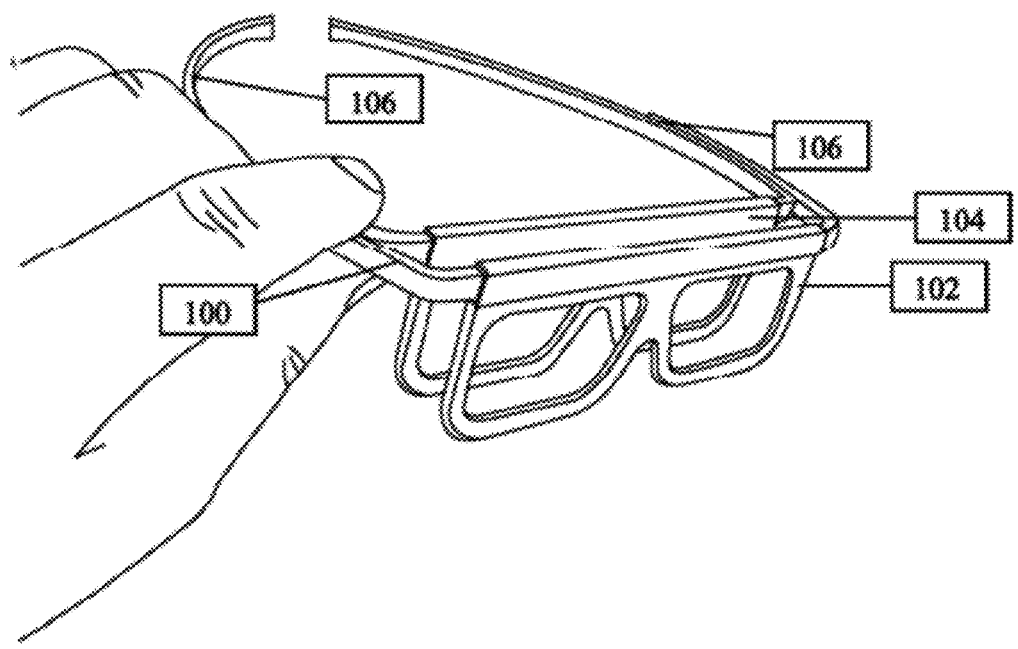
FIG. 3 is a diagram illustrating the glasses frame of FIG. 1 in accordance with one embodiment.
Figure 4:
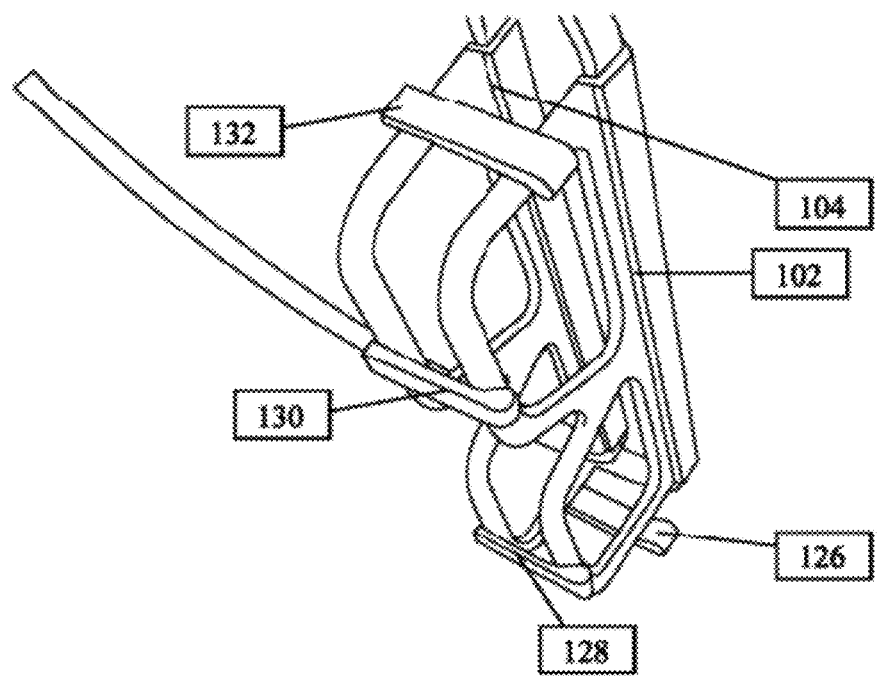
FIG. 4 is a diagram illustrating an alternative view of the glasses frame of FIGS. 1 and 3 in accordance with one embodiment.

Referring to FIG. 3, a diagram is shown illustrating the glasses frame of FIG. 1 in accordance with one embodiment. Referring to FIG. 4, a diagram is shown illustrating an alternative view of the glasses frame of FIGS. 1 and 3 in accordance with one embodiment. Shown in FIGS. 3 and 4 are the glasses frame 100, the front frame 102, the back frame 104, and the pair of temple portions 106. The lens frame 100 of FIG. 4 also includes four support members 126, 128, 130 and 132. The support members 126, 128, 130 and 132 connect between the front frame 102 and the back frame 104. The support members 126, 128, 130 and 132 keep the interchangeable sets of lenses in place. There are no support members on the top portion of the glasses frame 100 so that the interchangeable lenses 108, 110, 112 can easily slide in and out of the glasses frame 100. As described above, in alternative embodiments other means are utilized to interchange the lenses. For example, in one embodiment, the sets of lenses 108, 110 and 112 include hooks that latch to the glasses frame 100, which allows the sets of lenses to be easily interchanged. In this embodiment, the glasses frame 100 does not need 5 a front frame 102 and a back frame 104. For example, the glasses frame 100 would only need to include the temple portions 106 and a cross support connecting the two temple portions 106 together. Again, other embodiments can also be utilized for the interchangeable lenses.

Figure 5:
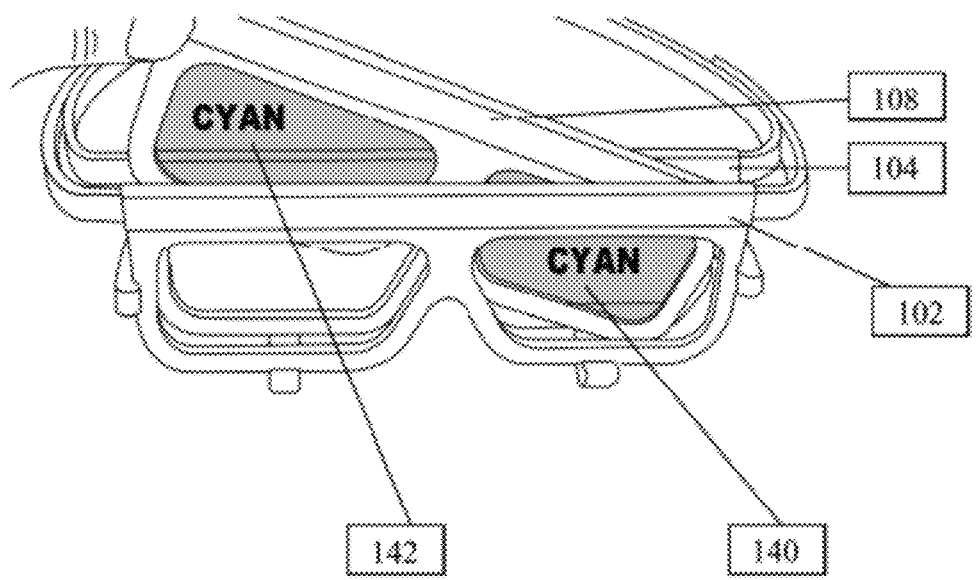
FIG. 5 is a diagram illustrating the glasses frame and a first set of replaceable lenses in accordance with one embodiment.

Referring to FIG. 5, a diagram is shown illustrating the glasses frame and the first set of replaceable lenses in accordance with one embodiment. The first set of replaceable lenses 108 is placed between the front frame 102 and back frame 104 of the glasses frame 100. (The first set of replaceable lenses 108 is being held slightly out of the glasses frame 100 in FIGS. 5-7 for illustrative purposes.) In the embodiment shown, the first set of replaceable lenses 108 includes two cyan lenses 140, 142.

Figure 6:
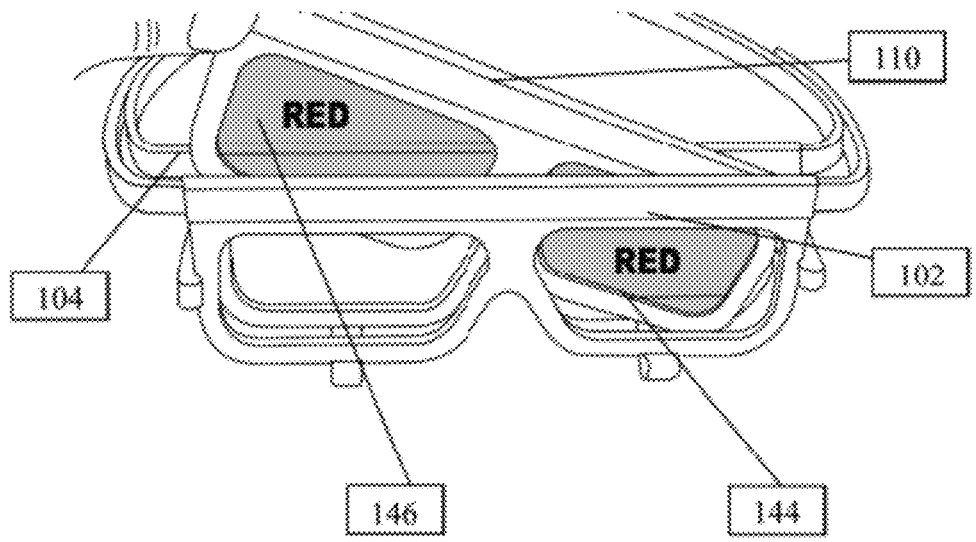
FIG. 6 is a diagram illustrating the glasses frame and a second set of replaceable lenses in accordance with one embodiment.

Referring to FIG. 6, a diagram is shown illustrating the glasses frame and a second set of replaceable lenses in accordance with one embodiment. The second set of replaceable lenses 110 is placed between the front frame 102 and back frame 104 of the glasses frame 100. In the embodiment shown, the second set of replaceable lenses 110 includes two red lenses 144, 146.

Figure 7:
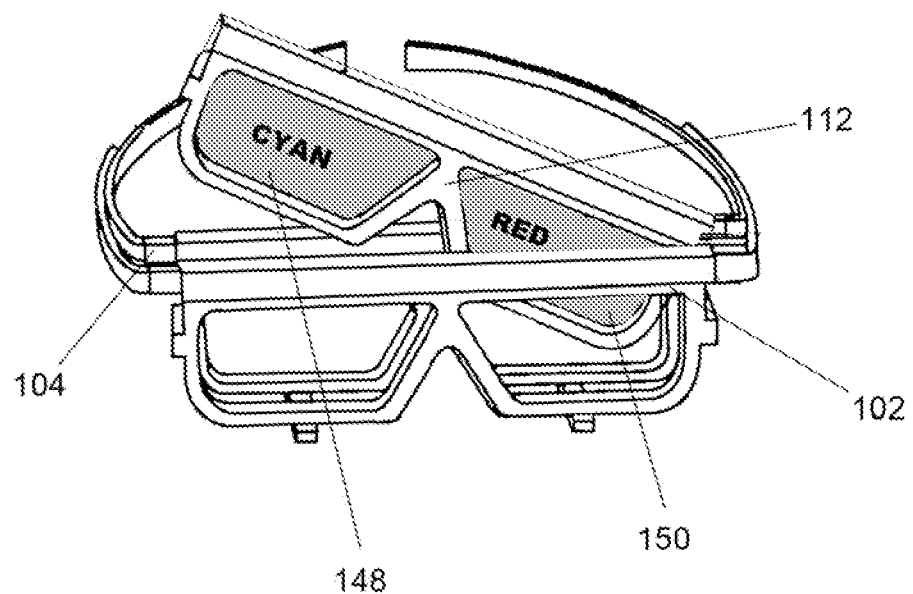
FIG. 7 is a diagram illustrating the glasses frame and a third set of replaceable lenses in accordance with one embodiment.

Referring to FIG. 7, a diagram is shown illustrating the glasses frame and a third set of replaceable lenses in accordance with one embodiment. The third set of replaceable lenses 112 is placed between the front frame 102 and back frame 104 of the glasses frame 100. In the embodiment shown, the third set of replaceable lenses 108 includes a cyan lens 148 and a red lens 150. As described above, other color lenses than those describe in FIGS. 5-7 are utilized in other embodiments.

Figure 8:
FIG. 8 is a diagram illustrating a person wearing the glasses frame 5 with one of the sets of replaceable lenses and coloring lines of a 3D connect the dot drawing.

Referring to FIG. 8, a diagram is shown illustrating a person wearing the glasses frame with one of the sets of replaceable lenses and coloring lines of a 3D connect the dot drawing. The person is filling in a 3D connect-the-dot drawing, as will be described below with reference to FIGS. 9-12.

Figure 9:
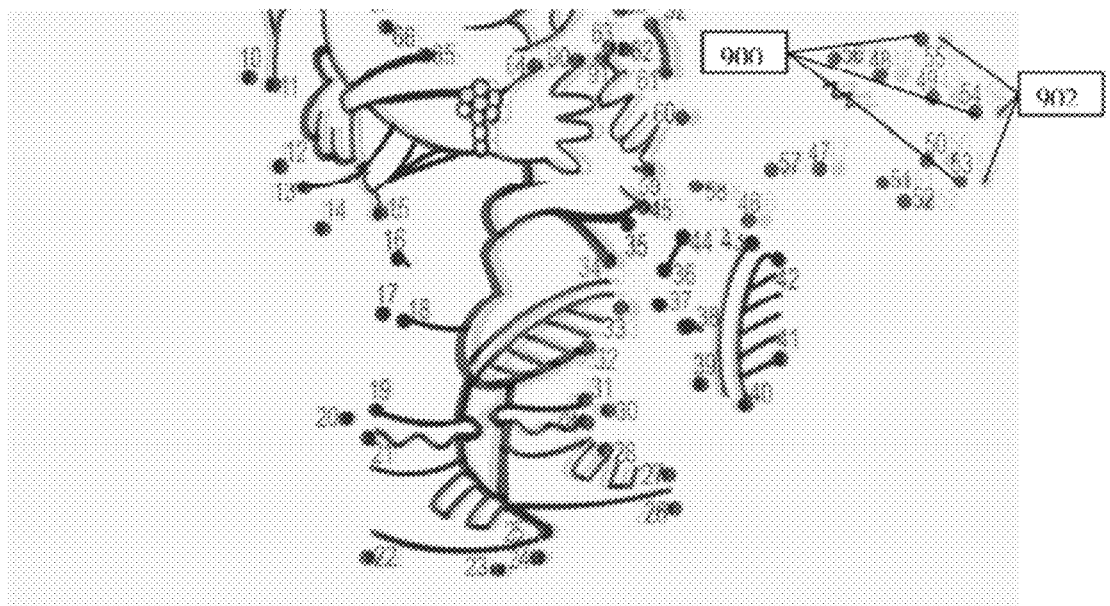
FIG. 9 is a diagram illustrating a 3D connect-the-dot drawing in accordance with one embodiment.
Figure 10:
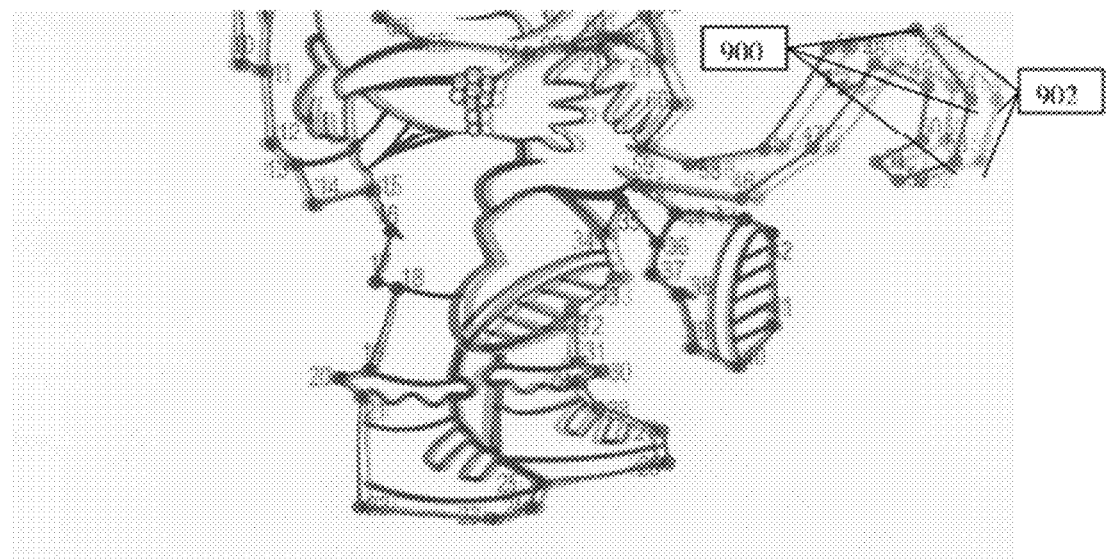
FIG. 10 is a diagram illustrating the 3D connect-the-dot drawing of FIG. 9 after the red and cyan colored lines have been connected.

Referring to FIG. 9, a diagram is shown illustrating a 3D connect-the-dot drawing in accordance with one embodiment. Referring to FIG. 10, a diagram is shown illustrating the 3D connect-the-dot drawing of FIG. 9 after the red and cyan colored dots have been connected using red and cyan colored drawing instruments, respectively. The 3D connect-the-dot drawings include a cyan set of numbered dots and a red set of numbered dots. The dots that make up the monkey's tail are most easily recognized, given their separation from each other. (The variance in separation of the dots is one factor for creating the 3D effect.) As an example, the red dots includes dots numbered 53, 54 and 55 are labeled as 900. The cyan dots 53, 54 and 55 are labeled as 902. These dots are connected with red or cyan colored lines, as shown in FIG. 10. After the dots have been connected, a use can view the completed 3D drawing through the third set of interchangeable lenses.

Figure 11:
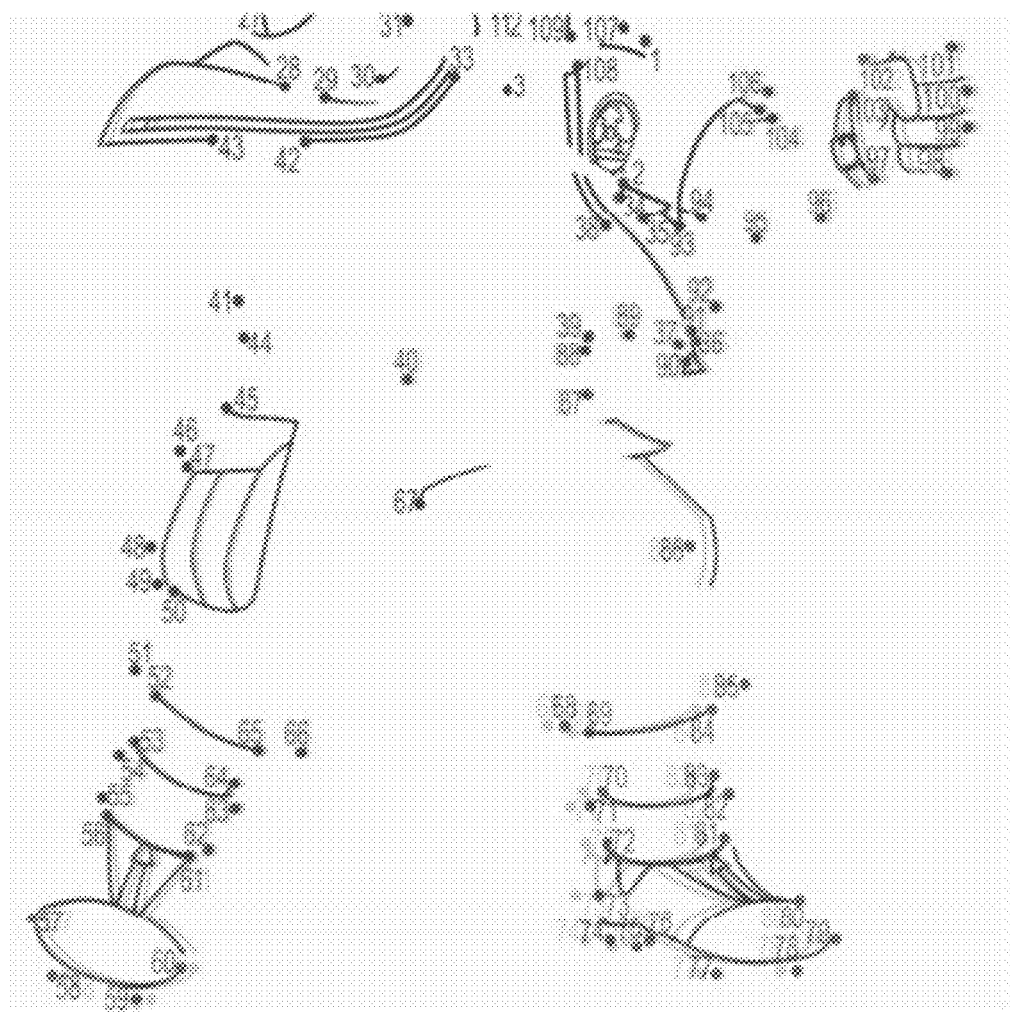
FIG. 11 is a diagram illustrating a 3D connect-the-dot drawing in accordance with one embodiment.
Figure 12:
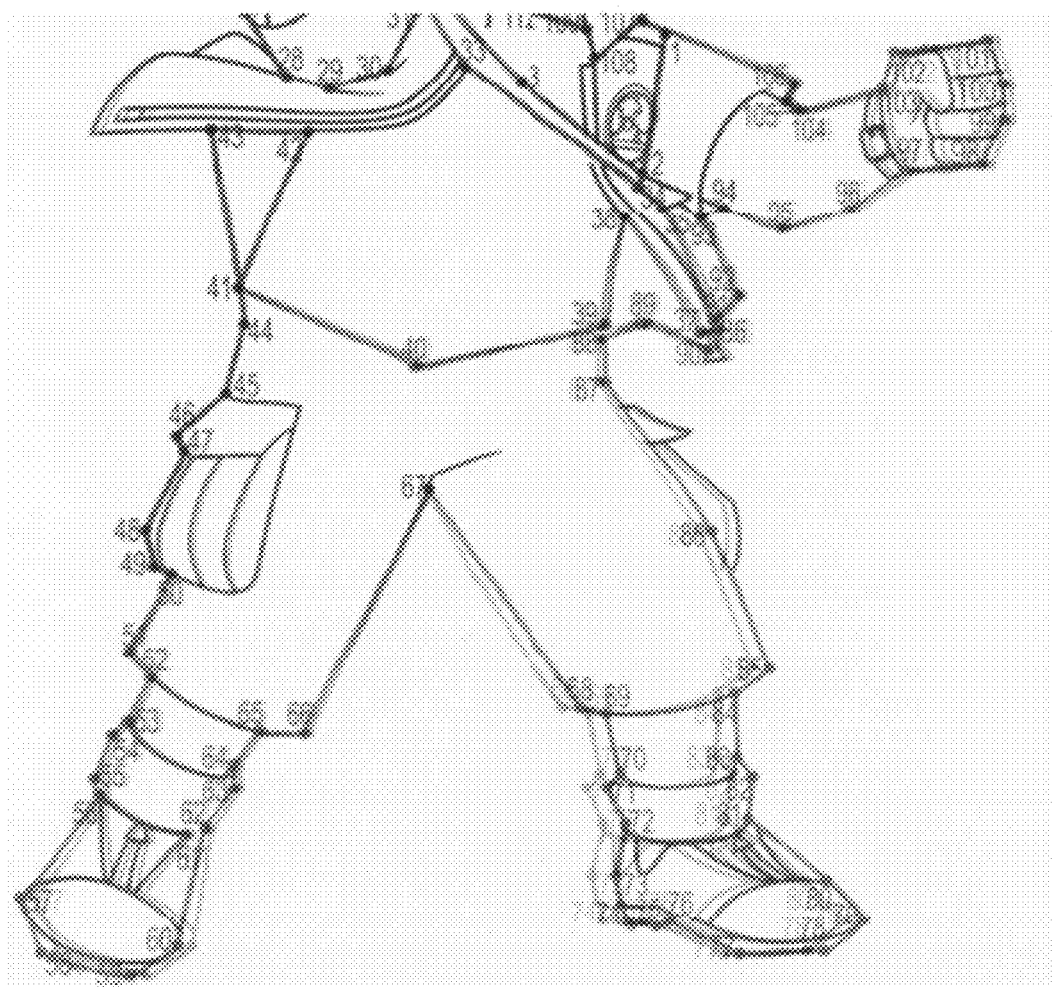
FIG. 12 is a diagram illustrating the 3D connect-the-dot drawing of FIG. 9 after the red and cyan colored lines have been connected.

Referring to FIG. 11, a diagram is shown illustrating a 3D connect-the-dot drawing in accordance with another embodiment. Referring to FIG. 12, a diagram is shown illustrating the 3D connect-the-dot drawing of FIG. 11 after the red and cyan colored dots have been connected using a red and cyan colored drawing instruments, respectively.

It is well known in the art how to create 3D drawings (e.g., anaglyphs) for pictures of drawings. However, these techniques have not been applied to connect the dot drawings. Thus, the offset between the cyan and red lines for the connect-the-dot drawings, can be determined by one of skill in the art of 3D image processing.

Referring to FIG. 13, a diagram is shown illustrating an alternative embodiment of a set of glasses having interchangeable lenses in accordance with one embodiment. Shown is a set of 3D glasses with interchangeable lenses 1300, including a first temple portion 1302, a second temple portion 1304, a first red lens 1306, a first cyan lens 1308, a first clear lens, a first hinge 1312, a second hinge 1314, a second red lens 1316, a second, cyan lens 1318, a second clear lens 1320, a third hinge 1322 and a fourth hinge 1324.

The first clear lens 1310 is coupled to the cyan red lens 1308 through the first hinge 1312. Similarly, the first red hinge 1306 is coupled to the first clear lens 1310 through the second hinge 1314 and the second cyan lens 1318 and second red lens 1316 are coupled to the second clear lens 1320 through the third hinge 1322 and fourth hinge 1324, respectively. The hinges allow the red or cyan colored lenses to be bent down in front of the clear lenses.

In operation, when a user is going to fill in the cyan colored dots in the 3D connect the dot drawings shown in FIGS. 9-12, the red lenses 1306, 1316 will be folded down in front of the clear lenses 1310, 1320. The user will then see the cyan colored dots and be able to connect them. Next, the red lenses 1306, 1316 will be folded back up and the cyan colored lenses 1308, 1318 will be folded down in front of the 5 clear lenses 1310, 1320. The user will then be able to see the red colored dots on the 3D connect the dot drawing and be able to connect them.

Finally, one of the cyan colored lenses 1308 or 1318 will be folded up and the corresponding red colored lens 1306 or 1316 will be folded down such that there is one red lens and one cyan lens in front of the clear lenses 1310, 1320. The user will then be able to view the completed 3D connect the dot drawing that was created.

Optionally, the clear lenses 1310, 1320 are removed leaving only the frame that is attached to the hinges. Additionally, while a number of different embodiments of glasses with interchangeable lenses has been shown, other alternative embodiments can also be utilized without deviating from the scope of the invention. In one instance, any means of providing a set of glasses with the option of having one set of red lenses, one set of cyan lenses and finally, one cyan lens and one red lens will be within the scope and spirit of the present invention.

While the invention herein disclosed has been described by means of specific embodiments and applications thereof, other modifications, variations, and arrangements of the present invention may be made in accordance with the above teachings other than as specifically described to practice the invention. The scope of the invention should be determined in reference to the claims.

I claim:

1. A three dimensional connect the dots game comprising:
   a pair of interchangeable glasses comprising:
      a glasses frame;
      a first pair of lenses that are interchangeable with the glasses frame and have a first set of lenses that are a first color;
      a second pair of lenses that are interchangeable with the glasses frame and have a second set of lenses that are a second color; and
      a third pair of lenses that are interchangeable with the glasses frame and have a third set of lenses, where the third set of lenses includes a first lens that is the first color and a second lens that is the second color;
   a first set of dots of a first color on a surface for use with the pair of interchangeable glasses; and
   a second set of dots of a second color located on the surface for use with the pair of interchangeable glasses, wherein the dots are positioned such that a completed three dimensional drawing is created after the dots are connected using a first drawing instrument of the first color and a second drawing instrument of a second color and then viewed using the pair of interchangeable glasses.

2. The three dimensional connect the dots game of claim 1 wherein the first color is cyan and the second color is red.

3. The three dimensional connect the dots game of claim 1 further comprising:
   the first drawing instrument of the first color; and
   the second drawing instrument of the second color.

4. The three dimensional connect the dots game of claim 3 wherein the first color is cyan and the second color is red.

5. A three dimensional connect the dots game comprising:
   a pair of glasses comprising:
      a frame; and
      at least four interchangeable lenses coupled to the frame, wherein two of the lenses are a first color and two of the lenses are a second color;
   a first set of dots of the first color on a surface for use with the pair of interchangeable glasses; and
   a second set of dots of the second color located on the surface for use with the pair of interchangeable glasses, wherein the first set of dots and the second set of dots are positioned such that a completed three dimensional drawing is created after the dots are connected using a first drawing instrument of the first color and a second drawing instrument of a second color and then viewed using the pair of glasses.

6. The three dimensional connect the dots game of claim 5 wherein the first color is cyan and the second color is red.

7. A three dimensional connect the dots game comprising:
   three pairs of glasses, wherein a first set of glasses includes two lenses having a first color, a second set of glasses includes two lenses having a second color, and a third set of glasses includes a first lens having the first color and a second lens having the second color;
   a first set of dots of the first color on a surface for use with the pair of interchangeable glasses; and
   a second set of dots of the second color located on the surface for use with the pair of interchangeable glasses, wherein the first set of dots and the second set of dots are positioned such that a completed three dimensional drawing is created after the dots are connected using a first drawing instrument of the first color and a second drawing instrument of a second color and then viewed using the third set of glasses.

8. The three dimensional connect the dots game of claim 7 wherein the first color is cyan and the second color is red.

* * * * *